June 21, 1955 C. G. MILBOURNE ET AL 2,711,419
PROCESS AND APPARATUS FOR MAKING FUEL GAS
Filed March 30, 1951
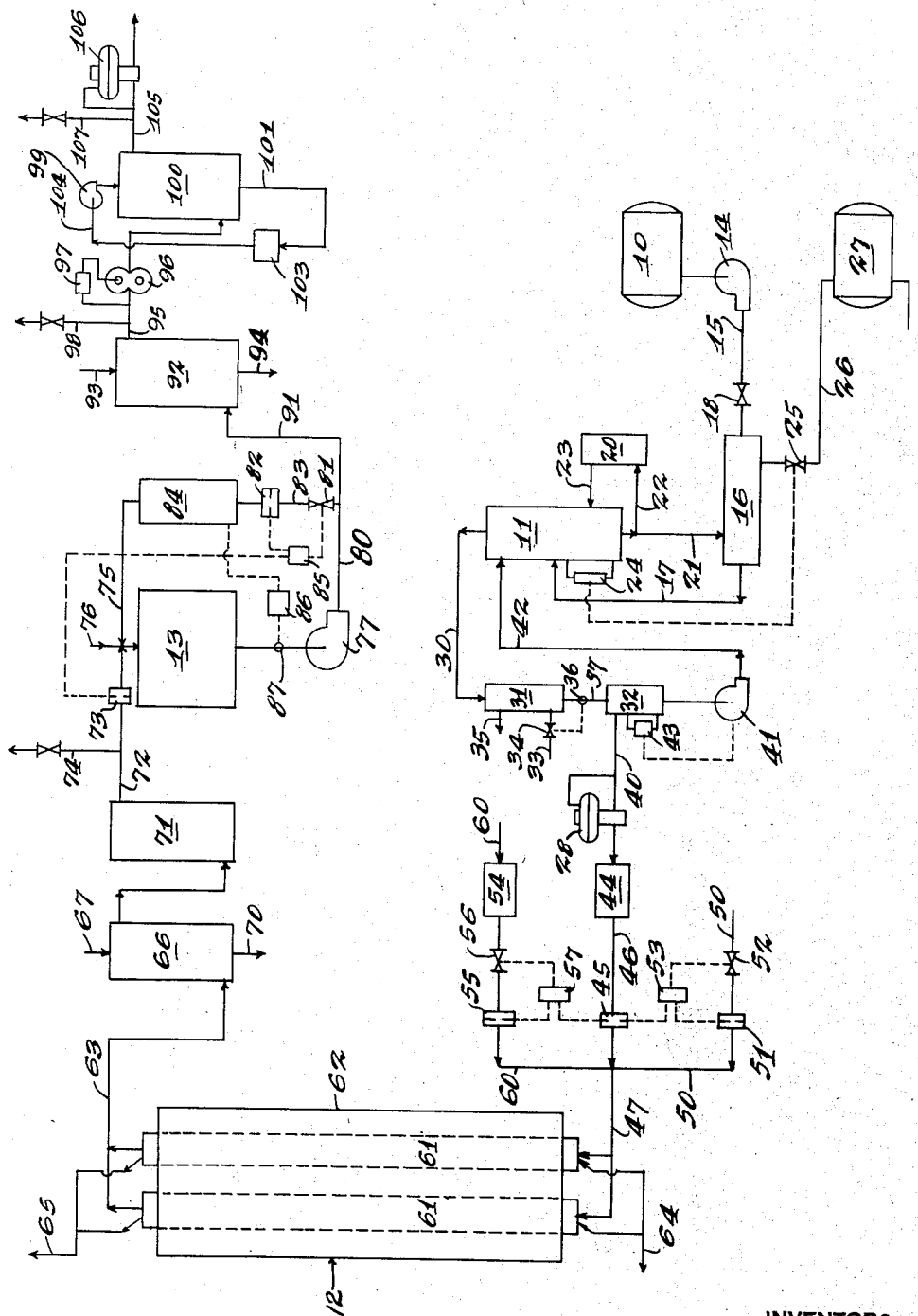
INVENTORS:
C. G. MILBOURNE
W. E. SPENGLER.
BY Charles A. Lind
ATTORNEY

United States Patent Office 2,711,419
Patented June 21, 1955

2,711,419
PROCESS AND APPARATUS FOR MAKING FUEL GAS

Charles G. Milbourne, Lansdowne, Pa., and William E. Spengler, Toledo, Ohio, assignors to Surface Combustion Corporation, Toledo, Ohio, a corporation of Ohio Application March 30, 1951, Serial No. 218,372

4 Claims. (Cl. 260—449.6)

This invention relates to fuel gas, and more particularly, to a process and apparatus for the manufacture of fuel gas.

In the normal city the ordinary demand for the fuel gas is substantially less than the maximum or peak load demand which may exist for short periods, usually in the winter. It is not commercially practical to design the regular city gas plant to care for the peak load demand, since during the greater portion of the time, when only the ordinary demand exists, the plant would be operated at a fraction of its capacity.

The problem of devising a suitable auxiliary means for furnishing supplement gas is complicated by numerous technical and economic considerations. The supplement gas source must be reliable. The apparatus furnishing the supplement gas must be easily operated and adaptable to accurate control. The preparation of the gas must involve relatively inexpensive equipment and materials. The high degree of safety required in the fuel gas industry also complicates the problem.

One of the most important factors to be considered in devising a commercial supplement gas producer is continuity of operation. Continuity of operation is necessary because, however short the period of emergency might be, the supply of supplement gas must not be interrupted during that period.

The base gas used in the main gas plant may be natural gas or a manufactured gas. The manufactured gases used are usually carburetted water gas, coke oven gas or mixtures of carburetted water gas and coke oven gases, which have a calorific value in the range of 500–600 B. t. u. per cubic foot and a specific gravity of about 0.35–0.70 (i. e., air being 1.0).

Fuel gases consisting essentially of hydrogen and carbon monoxide are available commercially, but such gases have a very low calorific value, in the neighborhood of 325 B. t. u. per cubic foot, since hydrogen and carbon monoxide each have calorific values of approximately 325 B. t. u. per cubic foot. A method ideally suitable for increasing the calorific value of such gases involves the use of a process known as "methanation." Methanation is a process which involves two reactions that may be represented by Equations 1 and 2 (below):

(1)     $CO + 3H_2 \rightarrow CH_4 + H_2O$
(2)     $2CO + 2H_2 \rightarrow CH_4 + CO_2$ Methanation may be carried out by passing a gas consisting essentially of hydrogen and carbon monoxide over a nickel type catalyst at an elevated temperature. To date methanation has been of no industrial significance in this country chiefly because a fuel gas suitable for use in the methanation process could not be obtained economically. The principal requirement of a fuel gas suitable for use in the methanation process is freedom from sulfur impurities (in the form of either organic sulfur compounds or hydrogen sulfide). Sulfur impurities are well known "poisons" for nickel catalysts; and the amount of sulfur impurities ordinarily present in a commercial fuel gas is such that poisoning or deactivation of a methanation catalyst takes place after a few hours of normal operation.

Avoidance of sulfur impurities in a fuel gas is a very difficult industrial problem. Almost all inexpensive raw materials for use in the preparation of fuel gases contain a substantial amount of sulfur impurities. Moreover, the purification of a fuel gas to remove sulfur impurities contained therein has always been understood to be an extremely expensive operation.

One method of producing a catalytically reformed fuel gas that consists essentially of hydrogen and carbon monoxide is known as the "water gas" reaction, which involves the reaction between steam and a hydrocarbon that may be represented by Equation 3 (below):

(3)     $C + H_2O \rightarrow CO + H_2$

Water gas may be prepared in a state of purity depending upon the purity of the hydrocarbon feed stock by the interaction of hydrocarbons with steam in the presence of a suitable catalyst. A gas substantially free from hydrocarbons may be produced by the use of an excess of steam (and occasionally a small amount of air) and a temperature higher than that required for catalytic reaction. The catalyst used, however, is one of the well known nickel type catalysts, i. e., catalysts of the nickel (Ni) group activated with a difficultly reducible oxide of a metal (e. g., Al, Cr, or V). The hydrocarbon used is preferably one of the paraffins such as butane or propane. Gases containing a large proportion of methane or the products of a cracking process (which may contain the simple olefins) may be used. Liquid hydrocarbons which can be vaporized completely may also be treated successfully in a water gas reaction.

An example of an inexpensive hydrocarbon feed stock is naphtha, which consists of a mixture of low boiling hydrocarbons obtained in the distillation of petroleum, coal tar and shale oil. Inexpensive feed stocks consisting of hydrocarbons whose boiling points are within the boiling range of naphtha are liquids that can be handled easily under normal conditions of temperature and pressure. However, such hydrocarbons almost invariably contain a substantial amount of sulfur impurities.

The object of the present invention is to provide a relatively simple and practical process and apparatus for the use of methanation in the preparation of a fuel gas.

For a consideration of what we believe to be novel and our invention, attention is directed to the following specification and the claims appended thereto.

The invention relates to a process and apparatus for the manufacture of a fuel gas by carrying out the step of methanating a catalytically reformed product gas consisting essentially of hydrogen and carbon monoxide; the catalytically reformed product gas being prepared from a feed stock comprising hydrocarbons whose boiling points are within the boiling range of naphtha, notwithstanding the fact that such a feed stock contains sulfur impurities which are poisons for nickel type catalysts.

More specifically, the invention is based upon the discovery that a successful commercial operation of the process depends upon carrying out the following steps: (1) catalytically reforming or converting the light ends (as distinguished from the heavy ends) of a naphtha type feed stock containing sulfur impurities, so as to obtain a product gas consisting essentially of hydrogen and carbon monoxide, (2) passing the product gas through a sulfur adsorber or scrubber so as to remove a substantial proportion of the sulfur impurities present and (3) subjecting the purified product gas to methanation conditions so as to increase the methane content to that desired. It appears that the initial step of catalytically reforming a naphtha type feed stock is peculiarly adapted to the production of a product gas suitable for use in methanation, because catalytic reformation has a combination of functions in connection with the sulfur impurities in the feed stock, the net effect of which is to make possible the manufacture of a product gas which does not cause rapid deactivation of the methanation catalyst.

The accompanying drawing forming part of this specification discloses a flow diagram and schematic representation of the apparatus employed in carrying out the invention.

A plant constructed in accordance with the present invention will ordinarily comprise a still system, a high temperature catalytic chamber or converter 12 and a methanator 13 as its main components. Naphtha is drawn from a storage tank 10 by a pump 14 and is delivered through conduit 15, valve 18, heat exchanger 16 and conduit 17 to still 11 wherein a light fraction (e. g. $C_6$ through $C_9$ hydrocarbons) is separated from the heavier components of the naphtha. Heat is supplied to the still 11 by a reboiler 20 which withdraws heavy ends through return conduit 21 and conduit 22, heats the heavy ends as by a steam coil in the reboiler 20 and returns the heavy ends to the still 11 by conduit 23. A liquid level control device 24 operates a valve 25 to maintain a desired liquid level in the still 11, and excess liquid, or bottoms, from the still passes through return conduit 21 to heat exchanger 16 wherein heat is transferred to incoming hydrocarbons from the naphtha storage tank 10, the still bottoms then being delivered by a conduit 26 to a second storage tank 27 wherefrom it may be withdrawn and burned to provide heat for portions of the apparatus yet to be described or for a steam generator not shown in the drawing.

The still system includes a reflux system comprising a vapor conduit 30 from the top of the still 11 to a partial condenser 31 and a separator 32 wherein the vapor and liquid are separated. The vapor entering the partial condenser via conduit 30 is cooled therein by water which enters the partial condenser 31 by water pipe 33 having a control valve 34 and leaves by water pipe 35. Flow of cooling water into the partial condenser is controlled by valve 34 responsive to a thermostat 36 in conduit 37 leading from the partial condenser to the separator whereby to control the temperature at which vapor is separated from condensate in the separator, and thus effectively controlling the composition of the hydrocarbon feed (naphtha) which flows from the separator 32 by way of the conduit 40. Condensate from the separator is delivered by a pump 41 in conduit 42 to the top of the still 11 as reflux. The quantity of reflux condensate delivered by the pump 41 is controlled by a level control device 43 controlling the liquid level in the separator.

The vapor from the separator 32, known as reactor hydrocarbon feed stock is delivered through a back pressure regulator 28 to a mixing system, passing through a preheater 44 and through a metering orifice 45 in conduit 46 to a manifold 47 wherein it is admixed with steam and air. Steam is passed through conduit 50 to manifold 47, passing through orifice 51 in quantities proportional to the flow of hydrocarbon feed stock flowing through orifice 45 and controlled by a valve 52 subject to proportioning control instrument 53. Similarly air is preheated in preheater 54 and passes through air orifice 55 in quantities controlled by valve 56 in air conduit 60 responsive to air to feed stock proportioning instrument 57. Air and feed stock are preheated to about 325° F. to 350° F. before mixing with the superheated steam to maintain uniform metering conditions and to avoid condensing out the steam and hydrocarbon.

Gas mixture in the manifold 47 is fed to reaction tubes 61 in a furnace 62 wherein the mixture contacts an incandescent refractory body for partial oxidation of the feed stock by the steam and/or oxygen. The refractory body is maintained at incandescence by external heat, i. e., heat of combustion which takes place in the furnace 62 but outside the reaction zone which is inside the tubes 61 which contain the refractory body. The refractory body is preferably composed of small shapes of high temperature porous refractory upon which has been deposited a metallic catalyst of the nickel type as from a solution of nickelous nitrate or cobaltous nitrate or the like, and the reaction temperature is higher than that of the subsequent methanation reaction, preferably from 1600° F. to 1900° F.

The catalytic reformation process involves a vapor phase reaction and may be carried out at any desired pressure which permits the reacting materials to remain in the vapor phase. A pressure slightly greater than atmospheric pressure is ordinarily the most desirable pressure from an industrial point of view and is, therefore, preferred.

The rate of flow is essentially a matter of industrial expediency. It is necessary to obtain an intimate contact between the catalyst and the reacting gases for a sufficient period of time to carry out the reactions to substantial completion, and this may ordinarily be accomplished by passing the gases through a catalyst bed at turbulent flow rates, and temperatures substantially higher than those absolutely necessary to cause the reaction to take place.

The temperatures used in the instant process are dependent upon such a factor as the rate of flow. Ordinarily the temperature must be increased if the rate of flow is increased in order to continue to carry the reactions to substantial completion.

The exact operating conditions required to obtain a desired product by carrying out a process embodying the invention can be readily determined experimentally. For example, the preparation of a gas having a calorific value of 328 B. t. u. per cubic feet and a specific gravity of 0.38 may be demonstrated by carrying out the following procedure (using the apparatus described in the drawing).

Naphtha feed stock at a rate of 10.35 gallons per hour is fed into the still 11 wherein the heavy ends of the feed stock are removed as still bottoms at a rate of 0.967 gallon per hour and the light ends (B. P. 200°–400° F.) are removed as distillate at a rate of 9.38 gallons per hour, passed through the preheater 44 so as to be maintained in vapor phase and then fed through the conduit 46 into the manifold 47. The unit is operated under a pressure of 5–25 pounds per square inch. The preheated distillate vapor is admixed with steam (250°–280° F.) at a rate of 121.7 pounds of steam per hour in the manifold 47. The vapor/steam mixture is then fed into the reaction tubes 61. These reaction tubes will ordinarily consist of a bank of chrome-nickel alloy tubes, each about eight inches in diameter and about twenty feet long, positioned in the "hot" region of the furnace 62. The catalyst bed is contained within each reaction tube 61, and the average temperature maintained in the furnace 62 combustion chamber is about 1980° F. and the average temperature on the reaction tube surface is about 1860° F. The foregoing operation is carried out for a period of 35⅙ hours at the end of which time a total of 164,300 cubic feet of converted product gas is obtained. (As used herein the term "cubic feet" means cubic feet measured at standard conditions at 30 in. Hg pressure and 60° F. temperature.) The final product gas has the following average composition:

| | |
|---|---:|
| Carbon dioxide ($CO_2$) | 4.8 |
| Carbon monoxide (CO) | 25.9 |
| Hydrogen ($H_2$) | 66.6 |
| Methane ($CH_4$) | 2.7 |
| Nitrogen ($N_2$) | |
| Total | 100.0 |

As used herein, the terms "per cent" and "%" mean per cent by volume unless otherwise designated. It has been found that the partial conversion of a hydrocarbon in the water gas reaction is commercially unacceptable as a gas producing process because of the inevitable formation of carbon which takes place in carrying out such a process. It is possible that carbon may be an intermediate product in the water gas reaction, but it is believed that the carbon formation is caused chiefly by thermal cracking which is known to take place also at temperatures employed for the water gas reactions. In the foregoing demonstration, the presence of methane ($CH_4$) in the final product is evidence that some cracking has taken place. The water gas reaction takes place with carbon alone as well as with a hydrocarbon. Thus very little carbon is deposited on the catalyst, for example, during a continuous process involving the conversion of a hydrocarbon by a water gas reaction which is being carried to completion. The exact determination as to when the reaction is carried to completion is indicated by the methane ($CH_4$) content of the final product gas. On the other hand, methane is a gas which is produced in the methanation reaction and, therefore, it is not desirable to reduce the methane content of the product gas any more than necessary. Accordingly, the methane content of the product gas should be the maximum methane content that can be obtained without carbon deposition to such an extent that the continuity of operation is interrupted (taking into consideration the procedure and time necessary for "burnout" cycles for each of the reaction tubes). If the methane content exceeds 8 per cent, excessive carbon deposition on the catalyst usually results. In the practice of the invention it has been found that the reactions are being carried to a suitable extent if the methane content of the final product is less than 6 per cent, and under such conditions the carbon formation is not appreciable from an industrial point of view. It is preferable to operate under such conditions that the methane content in the converted gas product is about 3–6 per cent.

It has been found that certain calculated operating relationships are particularly useful from an industrial point of view as factors to be considered in controlling the instant process. One of the important factors to be considered is the steam/vapor ratio, i. e., the ratio of the cubic feet per hour of steam used to the cubic feet per hour of hydrocarbon vapor used. It is assumed for the purpose of definition that at standard conditions steam is gaseous. Thus, in the foregoing demonstration the steam/vapor ratio is $121.7/18 \times 121/9.38 \times 1/6.23 = 14.1$ (assuming naphtha used to be $C_{8.5}H_{19}$, specific gravity: 0.7478). The steam/vapor ratio must be such that there is a sufficient total quantity of oxygen present to carry out the conversion of the hydrocarbon to substantial completion. One of the main functions of steam in the process is believed to be the reduction of carbon formation, and ordinarily the minimum steam/vapor ratio for any given set of conditions is that ratio necessary to reduce the methane to the desired proportion in the converted gas, i. e., about 5 to 15.

The furnace temperatures are considered to give a good indication of the catalyst temperatures, although the exact temperature of the catalyst at a given point is influenced by several factors. Heat is supplied to the catalyst by the furnace and heat is removed from the catalyst by the (endothermic) water gas reaction. If the catalyst temperature is too low carbon deposits on the catalyst, and the minimum furnace temperature which may be employed under given operating conditions is that temperature at which the carbon deposit on the catalyst is not appreciable industrially. The minimum permissible furnace temperature depends upon the other operating conditions, but for usual operating conditions the minimum temperature is about 1750° F. and the maximum temperature is the maximum the equipment can stand (i. e., about 2300° F.). It is preferable to operate at temperatures substantially higher than the minimum permissible temperature, and ordinarily furnace temperatures of about 1950°–2000° F. give optimum results. The temperatures at the reaction tube surface are observed, and such temperatures may be used as the control temperature. The temperature of the catalyst in the tubes is of course substantially (perhaps 200° F.) less than the furnace temperature in the adjacent area.

Another and particularly important factor to be considered is the disposal of the sulfur impurities during catalytic reformation of the hydrocarbon. The sulfur present in naphtha consists essentially of organic sulfur compounds which have numerous different individual characteristics. Some of those compounds breakdown to form hydrogen sulfide with hydrogen from the reacted feed stock and some sulfur combines with the nickel or cobalt of the catalyst to form complex compounds and reduce its activity. While the quantity of sulfur which forms compounds with the catalyst is a substantial portion of the sulfur entering the tubes 61, the reduction of catalytic activity on this catalyst is not severe at these temperatures, and this catalyst may be regenerated by oxidation of the sulfur in periodic "burnout" cycles which at the same time burn off carbon deposits from the catalyst or refractory body. In normal operation the tubes 61 may operate for about a week continuously, and then one of them at a time is withdrawn from the "line." By suitable valves not shown the tube is disconnected from manifold 47 and from the discharge manifold 63 into which they discharge while steam and/or air is passed into the tubes from burnout manifold 64 and the resultant products are vented through a manifold 65. As these tubes 61 are burned out individually for short periods and infrequently, the total discharge therefrom is substantially constant.

Of the sulfur which leaves the tubes 61 in normal, or product gas, most is in the form of hydrogen sulfide which after passing through a gas cooler 66 of the direct spray type where water enters by conduit 67 and leaves by drain 70, is removed in an iron oxide box 71 or equivalent apparatus for removing hydrogen sulfide and a portion of the unreacted organic sulfur compound (such as one that utilizes cuprous chloride, potash, etc.). The product gas must be cooled to about 104° F. by the cooler 66 to make ferric oxide monohydrate most effective in removing $H_2S$. A small proportion of the sulfur compounds entering the reaction tubes are highly "refractory," that is they pass through the incandescent body of catalytic material therein without breaking down. These compounds will also pass through the methanating catalysts which are also of the nickel type but are usually more concentrated and pelletized and are maintained at lower temperatures of about 500° to 900° F. preferably about 850° F.

Purified product gas which has had the hydrogen sulfide removed in the iron oxide box 71 passes through a conduit 72, through metering orifice 73 and into the methanator 13. The quality of that gas is determined by suitable apparatus from sampling line 74, and its analysis, specific gravity or heat content can be determined. Where desirable these characteristics are easily altered as by adjusting the relative proportions of hydrocarbon feed stock, air and steam entering manifold 47 by proportioning instruments 53 and 57. The purified product gas is mixed with a recycle gas in conduit 75 and where desirable with steam from a conduit 76. The resulting mixture passes through a methanating catalyst in the methanator 13 and is passed by a fan 77 in conduit 80 through a valve 81 and an orifice 82 in a conduit 83 and thence into a combination heater and cooler 84 for exacting temperature control from which the recycle gas enters conduit 75 and is returned to the methanator. A proportioning control instrument 85 operates the valve 81 responsive to the orifices 73 and 82 to maintain a desired recycle gas volume ratio, and a temperature control instrument 86 controls the combination heater and cooler 84 responsive to a thermostat 87 to maintain the desired reaction temperature in the methanator.

The portion of the hot gas in conduit 80 not recirculated through the methanator 13 is passed through conduit 91 to a spray type cooler 92 wherein water entering by conduit 93 is sprayed over a suitable contactor and is drained through outlet conduit 94. The now cooled gas passes through conduit 95 to a compressor 96 which is controlled by a back pressure controller 97 to maintain a constant back pressure in conduit 95 and to avoid draining the system. Gas leaving the compressor 96 passes into a high pressure carbon dioxide scrubber 100 wherein carbon dioxide is removed to a desired level at about fifty pounds per square inch pressure by circulating water. The water is then removed through outlet 101 and delivered to a spray tower 103 wherein the carbon dioxide is removed and the water is cooled. The water is then returned by pump 99 through conduit 104 to the scrubber 100. The gas now regulated in $CO_2$ content passes through conduit 105 to a back pressure regulator 106 which maintains the desired 50 lbs./sq. in. pressure on the scrubber system, and is delivered thence to use. Sampling lines 98 and 107 are provided similarly to 74 to determine the quality of the gas at desirable points in the process, and the gas leaving the system by conduit 105 now has the heating value, specific gravity and chemical composition required for a 100% substitute for the prescribed fuel gas.

The disclosed process and apparatus is well adapted to the manufacture of a fuel gas utilizing a sulfur containing hydrocarbon feed stock for synthesis gas production and a methanation process.

Methanation involves a vapor phase reaction and may be carried out at any desired pressure which permits the reacting materials to remain in the vapor phase. Since the methanation reaction involves contraction instead of expansion it might be advisable to carry out the reaction at an elevated pressure, but satisfactory results are obtained using a pressure slightly greater than atmospheric pressure and such a pressure is preferred from an industrial point of view.

The rate of flow (of converted product gas into the methanation unit) is essentially a matter of industrial expediency. It is necessary to obtain an intimate contact between the catalyst and the reacting gases for a sufficient period of time to carry out the reaction to an appreciable extent, and this may ordinarily be accomplished by passing the converted gas/recycle gas admixture through the bed of catalytic material at turbulent flow rates, and temperatures somewhat higher than those absolutely necessary to cause the reaction to take place.

The temperature used in the methanation process is dependent upon such factors as the rate of converted gas flow and the converted gas/recycle gas (volume) ratio.

The exact operating conditions required to obtain a desired fuel gas by carrying out a methanation process embodying the invention can be readily determined experimentally. For example, the preparation of a fuel gas having a calorific value of 525 B. t. u. and a specific gravity of 0.62 may be demonstrated by carrying out the following procedure using the converted product gas hereinbefore described:

After the product gas is passed through the reaction tubes 61, it is cooled (to about 104° F.) by passing through the cooler 66 and then is passed through the iron oxide box 71, which is a cylindrical vessel about two feet in diameter and four feet in length about three-fourths full of iron oxide "sponge" or "chips." The essential purpose of the iron oxide is to remove sulfur impurities in the gas, particularly hydrogen sulfide. The purified product gas (at about 89° F.) is passed to the inlet of the methanator 13 at a rate of about 487 cubic feet per hour at which point it is admixed with recycle gas (at about 655° F.) which is returned from the heater 84 at a rate of about 5500 cubic feet per hour. The product gas/recycle gas mixture (at about 592° F.) is then passed through the methanator 13, which contains a tray of catalyst material prepared by admixing a washed precipitated nickel salt with Kieselguhr and then pressing and baking the mixture. The temperatures in the catalyst tray range from about 621–813° F. The methanated fuel gas is passed from the exit of the methanator (at about 642° F.) to the inlet of the recirculating fan 77 and from the outlet of the fan 77 some gas is passed out of the recirculation system and through the cooler 92 at a rate of about 439 cubic feet per hour, the remainder of the gas from the outlet of the fan 77 being recycled back through the heater 84. The methanated fuel gas so obtained has the following composition:

| | Per cent |
|---|---|
| Carbon dioxide ($CO_2$) | 20.9 |
| Carbon monoxide (CO) | 5.2 |
| Hydrogen ($H_2$) | 38.5 |
| Methane ($CH_4$) | 36.8 |
| Total | 101.4 |

The total is slightly over 100% because the Orsat apparatus used for the gas analysis does not allow correction for hydrocarbons higher than methane.

From the foregoing demonstration it is apparent that the methanation reaction was not carried to substantial completion, since appreciable amounts of carbon monoxide and hydrogen are present in the methanated gas. On the other hand, the proportion of carbon dioxide in the methanated gas is more than four times as much as the proportion of carbon dioxide in the converted product gas, although the total volume of the methanated gas is only about one-half of the total volume of the converted product gas used. As hereinbefore mentioned the principal reactions involved in methanation may be represented by Equations 1 and 2 (below).

(1) $\quad CO + 3H_2 \rightarrow CH_4 + H_2O$
(2) $\quad 2CO + 2H_2 \rightarrow CH_4 + CO_2$ In each of the foregoing reactions the contraction is theoretically 50%, since 4 volumes (or mols) of gas are converted to 2 volumes (or mols) of gas. It is believed that the reaction of Equation 1 predominates under the ordinary methanation conditions, but that the tendency for the reaction of Equation 2 to take place increases as the $CO/H_2$ ratio increases in the gaseous reaction mixture. Accordingly, the more nearly the reaction of Equation 1 is carried to completion the greater is the tendency to produce $CO_2$ during methanation. A certain amount of $CO_2$ in the methanated gas may be useful since the amount of $CO_2$ removed from the gas in a scrubber can be controlled and this offers a method for limited control of the calorific value and the specific gravity of the resulting scrubbed fuel gas. However, the conversion of a portion of the carbon content of the product gas to $CO_2$ is wasteful and should be minimized during the methanation operation.

It is also believed that one or more of the side reactions represented in Equations 4, 5 and 6 (below) may take place during methanation.

(4) $\quad CO + H_2 \rightarrow C + H_2O$
(5) $\quad 2CO \rightarrow C + CO_2$
(6) $\quad CH_4 \rightarrow C + 2H_2$ Each of the foregoing reactions involves carbon deposition and is undesirable because carbon deposition causes deactivation of the catalyst as well as interference with the free flow of gases through the catalyst tray.

It has been found that carbon deposition and carbon dioxide formation are reduced appreciably by decreasing the product gas/recycle gas (volume) ratio in the gaseous mixture entering the methanator. Presumably the improvement thus obtained is caused by more uniform temperature control which can be obtained by the use of an increased proportion of the (relatively inert, preheated) recycle gas in the methanator. The preferred product gas/recycle gas ratio for use in the invention is about 1/5 to about 1/10.

It has also been found that carbon deposition on the catalyst may be reduced substantially by incorporating a small amount of steam in the product gas/recycle gas mixture entering the methanator. The steam is thus added in an amount sufficient to cause appreciable reduction in carbon deposition but insufficient to interfere noticeably with the desired reaction taking place during methanation (particularly that of Equation 1).

As can be seen one of the main features of the instant invention resides in the fact that a great variety of properties may be obtained in a fuel gas obtained in the practice of the invention. The calorific value may be increased from that of water gas (approximately 325 B. t. u.) to as much as 850 B. t. u. The specific gravity can be varied widely by the production and use of selected proportions of carbon dioxide. The preferred operating conditions, of course, depend upon the particular properties desired in the methanated fuel gas.

An important aspect of the instant invention resides in the fact that it is peculiarly adapted to the continuous, economical and controlled production of a supplement gas having a calorific value in the range of 500–600 B. t. u. and a specific gravity in the range of 0.35–0.70. In the production of such a supplement gas it has been found that certain calculated operating relationships are particularly useful from an industrial point of view as factors to be considered in controlling the instant process. One important factor to be considered is the space velocity, i. e., the cubic feet of product gas (not including recycle gas) used per hour per cubic foot of apparent catalyst volume. In the foregoing demonstration the space velocity is 444.6. The space velocity indicates the amount of work being done by the catalyst, and as such the space velocity may be used to determine experimentally the conditions necessary for optimum catalyst efficiency. The composition of the methanated fuel gas gives the best indication of the desired space velocity (assuming that the product gas/recycle gas ratio is sufficiently low to maintain relatively uniform temperatures in the catalyst tray). As hereinbefore explained, it is not usually desired to carry the methanation reaction to completion, since the formation of excessive amounts of carbon dioxide is not economical. On the other hand, it is not commercially practical to operate at a space velocity sufficiently low to permit equilibrium conditions to exist in the catalyst bed. At the optimum space velocity (which is about 400 to 500 for the apparatus described) the $CO/CO_2$ volume ratio in the methanated gas is about 1/4.

As hereinbefore explained, continuity of operation is a necessary feature of a supplement gas producing process. Supplement gas must be supplied continuously during the entire emergency period, in other words, for a period up to 30 days which is the time requirement that has been established as minimum for continuous operation of a supplement or standby gas plant. The amount of sulfur impurities ordinarily present in a fuel gas is such that a methanation catalyst would be completely deactivated after a few hours of operation.

One of the most unexpected features of the present invention resides in the discovery that ordinary naphtha, containing about 0.05% (by weight) of sulfur, can be used as a starting material for continuous operation in the practice of the invention. In fact, a 30-day test run was carried out using the apparatus described herein and substantially the same conditions as those described in the foregoing demonstrations and continuous operation was maintained during this period (with the exception of a limited amount of breakdown time) without changing the methanation catalyst on the tray and without attempting to reactivate the methanation catalyst. During the test run sulfur determinations were made on the naphtha feed stock, distillate, still bottoms, converted product gas before and after the iron oxide purification, and methanated fuel gas. Table I (below) sets forth the distribution of the sulfur (on a per cent by weight of sulfur basis) introduced into the system in the naphtha feed stock.

Table I

| | Per cent |
|---|---|
| Sulfur left in still bottoms | 11.4 |
| Sulfur deposited on converter catalyst | 62.19 |
| Sulfur deposited on iron oxide | 25.2 |
| Sulfur deposited on methanation catalyst | 1.06 |
| Sulfur in methanated gas | 0.15 |
| Total | 100.00 |

As used herein with reference to sulfur, the terms "per cent" and "%" mean per cent by weight of the element sulfur regardless of whether the sulfur is contained in an organic sulfur compound, in hydrogen sulfide or in some other (unrecognizable) form. The naphtha feed stock used contained about 0.05% of sulfur and Table II (below) sets forth the average sulfur concentrations in grains per 100 cubic feet of gas which were determined from samples taken at various points in the apparatus during the test run described.

Table II

Sulfur in naphtha entering converter. 4.44 gr. per 100 CF of prod. gas (or 8.11 gr. per 100 CF of meth. gas).
Sulfur in prod. gas leaving converter. 1.28 gr. per 100 CF of prod. gas (or 2.34 gr. per 100 CF of meth. gas).
Sulfur in prod. gas leaving iron oxide. 0.06 gr. per 100 CF of prod. gas (or 0.11gr. per 100 CF of meth. gas).
Sulfur in meth. gas leaving methanator. 0.01 gr. per 100 CF of meth. gas.

From Tables I and II it is apparent that the converter catalyst plays a very important and critical role in the removal of sulfur. As was mentioned hereinbefore the deactivating effect of sulfur upon the converter catalyst is not industrially significant, not only because of the high operating temperatures of the converter but also because of the "burnout" procedure employed for removal of the carbon deposited on the catalyst. It has been found that during the "burnout" procedure it is possible to remove practically all the sulfur deposited with the carbon, particularly if high temperatures and an excess of air are used. The converter catalyst is critically different from the methanation catalyst in this respect. The converter catalyst is deposited in extremely fine particles upon a huge refractory area and, as such, it can stand very drastic "burnout" conditions without being deleteriously affected. On the other hand, the methanation catalyst is much more concentrated than the converter catalyst and is not mounted upon a highly heat-resistant material. The drastic "burnout" conditions used for the converter catalyst would cause a substantially complete deterioration of the methanation catalyst as mounted. It is believed that limited "burnout" conditions such as 700°–800° F. in the presence of a 2/1 mixture of steam and air might remove carbon deposited on the methanation catalyst, but such conditions would be ineffective for removal of an appreciable amount of the sulfur deposited thereon. Accordingly, the apparatus of the invention must be so designed and operated that continuous operation (without sulfur poisoning) of the methanation catalyst is possible and that a minimum amount of carbon deposits upon the catalyst during operation. On the other hand, the converter need only be operated so that neither the sulfur poisoning nor the carbon deposition takes place at a rate so rapid that a reasonable "burnout" cycle is inadequate for a given bank of reaction tubes. The converter should be designed so as to have sufficient capacity to remove at least the minimum amount of sulfur that is necessary to permit successful operation of the remainder of the apparatus of the invention. As will be explained hereinafter, the maximum amount of sulfur that should be present in the product gas leaving the converter is about 2 grains of sulfur per 100 cubic feet of product gas.

Another critically important function of the converter is the conversion of organic sulfur to hydrogen sulfide.

As in the case of practically all hydrocarbon raw materials which contain sulfur impurities, the sulfur impurities of naphtha are almost exclusively organic sulfur compounds. However, it was found that on the average about 90 per cent of the sulfur in the converted product gas is present as hydrogen sulfide and that about one third of the sulfur in the purified converted product gas is present as hydrogen sulfide. In other words, the converter has the dual function of removing about 60–70 per cent of the sulfur present in the feed stock and of converting about 90 per cent of the remaining portion of the sulfur to hydrogen sulfide, a compound removed by iron oxide much more readily than are the organic sulfur compounds.

The function of converting organic sulfur compounds to hydrogen sulfide is a vital function of the converter, since by converting the organic sulfur compounds to hydrogen sulfide the converter makes possible the removal of a very substantial proportion of the sulfur impurities by relatively inexpensive and simple methods such as contact with iron oxide or some other adsorbing material reactive with hydrogen sulfide. Organic sulfur compounds which are ordinarily much more difficult to remove than is hydrogen sulfide are also removed to a limited extent by the iron oxide, but iron oxide can remove only a relatively small amount of such sulfur compounds and the remainder would pass through the iron oxide and cause deactivation of the methanator catalyst. For example, the iron oxide removed all but about 2 per cent of the hydrogen sulfide leaving the converter, whereas it removed all but about 25 per cent of the organic sulfur compounds leaving the converter.

It can thus be seen that the operation of the converter must be so controlled that the amount of organic sulfur compounds in the product gas leaving the converter is held at a certain minimum. In general, such an operation requires designing the converter so that it has the capacity to remove all but a given maximum total amount of sulfur in the product gas and operating the converter so that it converts all but a given maximum amount of organic sulfur compounds to hydrogen sulfide. For the apparatus used in the run described herein, the maximum total amount of sulfur in the product gas leaving the converter should be about 2 grains per 100 cubic feet of gas and the preferred amount is not more than about 1.2 grains per 100 cubic feet. It has been found that ordinarily the required amounts of sulfur in the product gas are obtained using a naphtha feed stock if the reaction in the converter is carried out to substantial completion as hereinbefore described. The maximum amount of sulfur present in the product gas as organic sulfur compounds should be about 0.4 grain per 100 cubic feet and the preferred amount is not more than about 0.05 grain per 100 cubic feet. It has been found that the necessary extent of conversion of organic sulfur to hydrogen sulfide is obtained if the reaction is carried out to the extent hereinbefore described, in other words under such operating conditions as temperature and space velocity that the product gas contains no appreciable amount of hydrocarbon other than methane and the maximum amount of methane in the product gas is not more than 8 volume per cent; and it is preferable to carry out the reaction to such an extent that methane and carbon dioxide are present in substantially equal amounts, each one being not more than 6 volume per cent of the product gas. The reaction thus carried out in the converter might be represented by Equation 7 (below):

(7) $aH_2O + C_nH_{(2n+2)} \rightarrow bCO + cCH_4 + dCO_2 + eH_2$ wherein:

$C_nH_{(2n+2)}$ represents the average formula for naphtha, the subscript $n$ ranging from 6 to 9.
$a$ = at least $n$, so that there is at least a sufficient amount of oxygen present to convert all of the carbon to carbon monoxide.
$b = n - (c+d)$.
$c$ = not more than 0.08 $(b+c+d+e)$.
$d$ = not more than 0.08 $(b+c+d+e)$ and about the same as $c$.
$e = a + (n+1) - (2c)$.

It is, of course, apparent that the instant product gas is substantially different from fuel gases such as carburetted water gas and coke oven gas since these latter gases ordinarily contain a substantial quantity of sulfur impurities almost all of which are organic sulfur compounds. On the other hand, the instant process may employ as a starting material a gaseous steam/vapor mixture wherein the vapor is derived from some hydrocarbon source other than naphtha, because the first step in the instant process involves a conversion to hydrogen sulfide and a reduction in total sulfur content to such an extent that the remaining steps may be carried out in a continuous operation.

Also it has been found that an additional unique feature of the converter resides in its ability to impart "refractory" properties to a certain amount of the sulfur. Apparently a small amount of the sulfur is so affected during the conversion reaction that it becomes incapable of poisoning a nickel type catalyst. The fact that the sulfur thus converted passes through the methanator without depositing on the catalyst is demonstrated by the fact that a certain minimum amount of sulfur (e. g., about 0.005 grain per 100 cubic feet) appears in the methanated gas even though sulfur is being introduced into the methanator in such extremely small amounts that it would be expected that substantially all of the sulfur would be deposited on the catalyst.

As hereinbefore mentioned the adsorber used is a material such as iron oxide which removes hydrogen sulfide readily (and also may remove an appreciable proportion of the organic sulfur compounds). The essential feature of the adsorber is that it must remove substantially all of the hydrogen sulfide and it must be designed and operated accordingly. Since both hydrogen sulfide and organic sulfur compounds may poison the methanator catalyst, the adsorber must remove a sufficient amount of sulfur compounds to reduce the sulfur content of the gas to a given maximum figure (e. g., average of about 0.06 grain per 100 cubic feet) above which poisoning of the methanator takes place too rapidly for continuous operation.

Having described the invention, we claim:

1. A process for the manufacture of a supplement gas which comprises (1) mixing a hydrocarbon vapor, containing organic sulfur compounds, with steam in a proportion at least sufficient to form carbon monoxide with all of the carbon in such vapor, (2) maintaining the resulting mixture at a temperature of at least 1600° F. in contact with a nickel type catalyst until absorption of sulfur by the catalyst has reduced the sulfur content of the gas to not more than 2 grains per 100 cubic feet and until conversion of organic sulfur compounds to hydrogen sulfide has reduced the sulfur content of such compounds to not more than 0.4 grain per 100 cubic feet of gas, (3) removing sulfur compounds from the gas by chemical combination until the sulfur content of the gas has been reduced to not more than 0.06 grain per 100 cubic feet, and (4) maintaining the gas at a temperature from 500 to 900° F. in contact with a nickel type catalyst until the methane content has increased to the desired value, whereby the latter catalyst can be used continuously without regeneration for a period of 30 days.

2. A process as claimed in claim 1 wherein the catalyst used in step (2) is regenerated periodically by burning off the accumulated carbon and sulfur.

3. A process as claimed in claim 1 wherein the hydrocarbon is naphtha.

4. A process of preparing a gas which comprises (1) mixing a hydrocarbon vapor, containing organic sulfur compounds, with steam in a proportion at least sufficient to form carbon monoxide with all of the carbon in such vapor, (2) maintaining the resulting mixture at a temperature of at least 1600° F. in contact with a nickel type catalyst until absorption of sulfur by the catalyst has reduced the sulfur content of the gas to not more than 2 grains per 100 cubic feet and until conversion of organic sulfur compounds to hydrogen sulfide has reduced the sulfur content of such compounds to not more than 0.4 grain per 100 cubic feet of gas, and (3) removing sulfur compounds from the gas by chemical combination until the sulfur content of the gas has been reduced to not more than 0.06 grain per 100 cubic feet, whereby a nickel type catalyst can be used continuously in contact with the resulting gas at a temperature from 500 to 900° F. to increase the methane content of the gas to the desired value, without regeneration of the latter catalyst for a period of 30 days.

References Cited in the file of this patent

UNITED STATES PATENTS

| | | |
|---|---|---|
| 983,199 | Bedford et al. | Jan. 31, 1911 |
| 1,643,663 | Klatte et al. | Sept. 27, 1927 |
| 1,772,652 | White | Aug. 12, 1930 |
| 2,110,241 | Roelen | Mar. 8, 1938 |
| 2,567,596 | Clark | Sept. 11, 1951 |
| 2,568,351 | Milbourne | Sept. 18, 1951 |

FOREIGN PATENTS

| | | |
|---|---|---|
| 340,016 | Great Britain | Dec. 16, 1930 |

OTHER REFERENCES

Morgan, "A Textbook of American Gas Practice," vol. 1, pages 804–07. Published by Jerome J. Morgan, Maplewood, N. J., 1931.

Riesz, C. H., "Catalytic Cracking of Hydrocarbons," Institute of Gas Technology, Chicago, Ill. Received in Patent Office Library, November 1, 1948. (24 pages: see particularly pages 4, 6, 7, 8, 9, 10, Figs. 4 and 5, and Tables 4 and 5.)